US012719108B2

(12) United States Patent
Hu

(10) Patent No.: US 12,719,108 B2
(45) Date of Patent: Aug. 25, 2026

(54) BATTERY MODULE AND METHOD FOR PRODUCING A BATTERY MODULE WITH A COOLING DEVICE

(71) Applicant: AUDI AG, Ingolstadt (DE)

(72) Inventor: Wenkun Hu, Bruchköbel (DE)

(73) Assignee: AUDI AG, Ingolstadt (DE)

(*) Notice: Subject to any disclaimer, the term of this patent is extended or adjusted under 35 U.S.C. 154(b) by 614 days.

(21) Appl. No.: 18/336,178

(22) Filed: Jun. 16, 2023

(65) Prior Publication Data

US 2024/0039081 A1 Feb. 1, 2024

(30) Foreign Application Priority Data

Jul. 28, 2022 (DE) ......................... 102022118917.1

(51) Int. Cl.

| | |
|---|---|
| ***H01M 10/6557*** | (2014.01) |
| ***H01M 10/613*** | (2014.01) |
| ***H01M 10/653*** | (2014.01) |
| ***H01M 10/6567*** | (2014.01) |

(52) U.S. Cl.

CPC ..... *H01M 10/6557* (2015.04); *H01M 10/613* (2015.04); *H01M 10/653* (2015.04); *H01M 10/6567* (2015.04)

(58) Field of Classification Search

None

See application file for complete search history.

(56) References Cited

U.S. PATENT DOCUMENTS

2012/0021270 A1* 1/2012 Kumar .............. H01M 10/6566 429/120

FOREIGN PATENT DOCUMENTS

| | | | |
|---|---|---|---|
| DE | 102011107716 | A1 | 3/2012 |
| DE | 102014217188 | A1 | 3/2015 |
| DE | 102017130068 | A1 | 6/2019 |
| JP | 2021098308 | A | 7/2021 |
| WO | 2015117865 | A1 | 8/2015 |

OTHER PUBLICATIONS

Search Report issued on Mar. 6, 2023, in corresponding German Application No. 102022118917.1, 12 pages.

* cited by examiner

*Primary Examiner* — Wyatt P McConnell

(74) *Attorney, Agent, or Firm* — Maier & Maier, PLLC

(57) ABSTRACT

A battery module with a cooling device, which has multiple battery cells arranged next to one another in a first direction. The cooling device has at least one cooling unit, which is arranged between at least a first and a second battery cell arranged adjacent in the first direction. The cooling unit has a first wall and a second wall, and a first intermediate space through which a coolant can flow and which is delimited by the first and second walls in relation to the first direction. The first wall is formed from a first material, and the second wall is formed from a second material that is different from the first material. The first material has a higher thermal conductivity than the second material.

20 Claims, 2 Drawing Sheets

BATTERY MODULE AND METHOD FOR PRODUCING A BATTERY MODULE WITH A COOLING DEVICE

FIELD

The invention relates to a battery module with a cooling device, wherein the battery module has multiple battery cells arranged next to one another in a first direction, the cooling device having at least one cooling unit which is arranged between at least a first and a second battery cell of the multiple battery cells which are arranged adjacent in the first direction, and wherein the cooling unit has a first wall and a second wall, and a first intermediate space through which a coolant can flow, which intermediate space is arranged between the first and second wall in relation to the first direction and which is delimited by the first and second wall in and against the first direction. Furthermore, the invention also relates to a method for producing a battery module.

BACKGROUND

Battery cells of a battery module are usually arranged on a cooling plate in order to cool the battery cells during operation. A so-called gap filler can be used to thermally couple the battery cells with the cooling plate. In addition, a cell separation element is often used between the battery cells. This can take on various functions, such as insulating the battery cells electrically and thermally from one another. As a result, the cell separation element prevents the transfer of heat from cell to cell. This function is advantageous in the event of a so-called thermal runaway, namely a thermal runaway of a cell, in order to protect the neighboring cell from this thermal stress. The aim is to avoid what is known as thermal propagation, namely a thermal spill over and, as a result, thermal runaway of all battery cells. In addition, the assembly of multiple battery cells is usually pretensioned. This prevents the cell assembly from expanding or over-expanding over the course of its service life, over which the battery cells typically swell.

The gap filler causes high material costs as well as costs in production and customer service. The cell separation element is also a cost driver in the battery.

DE 10 2014 217 188 A1 describes a battery module with two or more stacked battery cells and cartridges for fixing the corresponding battery cells to form a battery stack. Each of the cartridges comprises a cooling fin in contact with the battery cells, wherein the cooling fin has two cooling plates spaced apart to define a coolant flow channel.

As a result, cooling can be provided between the battery cells, wherein the battery cells are however in turn thermally very well coupled via the cartridges, which is disadvantageous in the case of thermal propagation of one of the battery cells.

JP 2021-098308 A describes a multi-layer plate placed between multiple heat sources and which can dissipate heat from the heat sources. In this case, the plate comprises rubber layers, on which thermal insulation layers are applied on both sides, and on these, in turn, thermally conductive layers are arranged as the outermost layers. The heat can be dissipated from the heat sources via the thermally conductive layers, while the thermally insulating layers insulate the heat sources from one another. The heat dissipation takes place in particular via a cooling arranged on the underside of the arrangement. This system design is very bulky. In addition, compared to previous concepts, according to which thermally insulating cell separation elements are arranged between battery cells, the additional thermally conductive layers between the heat sources provide better thermal coupling between the heat sources, which has a disadvantageous effect in the event of a thermal runaway, despite the presence of the thermally insulating layers.

Furthermore, DE 10 2017 130 068 A1 describes a battery element in which, in addition to a battery cell, a heat-conducting element in the form of a multi-chamber hollow profile with chambers is also integrated. The temperature-controlled multi-chamber hollow profile is in planar contact with the battery cell, wherein the electrode stacks of the battery element are surrounded by an outer electrical insulation which is formed by an outer film or from this film and a thermoplastic coating of the multi-chamber hollow profile.

As a result, the production of the battery cells with integrated heat-conducting elements is significantly more expensive and complex. In addition, this does not provide any thermal insulation between the battery cells.

SUMMARY

The object of the present invention is therefore to provide a battery module and a method that allow the battery cells enclosed by the battery module to be cooled as efficiently as possible and at the same time to provide the best possible thermal insulation between the battery cells.

A battery module according to the invention comprises a cooling device and multiple battery cells arranged next to one another in a first direction, wherein the cooling device has at least one cooling unit which is arranged between at least a first and a second battery cell of the multiple battery cells, which are arranged adjacent in the first direction, wherein the cooling unit has a first wall and a second wall, and a first intermediate space through which a coolant can flow, which intermediate space is arranged between the first and second wall in relation to the first direction and which is delimited by the first and second wall in and against the first direction. In this case, the first wall is formed from a first material, and the second wall is formed from a second material that is different from the first, wherein the first material has a higher thermal conductivity than the second material.

As a result, cooling can advantageously be provided between the first and second battery cell, through which at least one of the two battery cells can advantageously be cooled, while at the same time thermal insulation can be provided between the two battery cells, namely by the second wall, which is formed from a material with a significantly lower thermal conductivity than the first wall. The combination of thermally insulating and thermally conductive elements, which in the present case are each provided by the first and second wall, also provides the cooling unit with the function of a cell separation element. By inserting such a cooling unit between two cells, in particular in place of the cell separation element, the mechanical contact between the cooling unit and the adjacent cells is also ensured, so that an additional gap filler or a thermal interface material can be omitted. A particular advantage, however, is that in the event of a thermal runaway, the cooling unit also provides an additional "cold wall" between the cells. In other words, the first and second battery cells are not only thermally insulated from one another by the second wall made of the thermally less conductive material, but also by the intermediate space between the first and second wall, through which a coolant can optionally flow, and which in both cases is a very good thermal insulator, namely both in the case that a coolant does not flow through it, due to the air or gas layer present in the intermediate space, and in the case that a coolant flows through it, due to the cold coolant flowing through the intermediate space. This advantageously makes it possible to provide cooling, in particular active cooling, between the battery cells and also to significantly increase the thermal insulation between the cells.

The battery cells can be prismatic battery cells, pouch cells, or round cells, for example. The design of pouch cells or round cells is particularly advantageous, since this allows the cooling unit to be designed in a flat manner and can therefore be integrated particularly easily between the battery cells. The battery cells can be lithium-ion cells, for example. The battery cells can also be clamped together in the first direction. In other words, a clamping force can be exerted on the battery cells in or against the first direction, for example by means of a clamping frame surrounding the cell stack of multiple battery cells arranged next to one another in the first direction. This is particularly advantageous as it promotes contact between the cooling unit and the battery cells adjacent to it. As a result, there are no or hardly any gaps between the cooling unit and the two adjacent battery cells. Accordingly, there is no need for an additional gap filler between the cooling unit and a respective adjacent battery cell. Nevertheless, it is conceivable to provide such a gap filler, namely a thermal interface material, between the first and/or second battery cell and the cooling unit.

The battery cells can also have a length and a width perpendicular to the first direction, that is, for example, a length in a second direction and a width in a third direction, wherein the second and third directions are perpendicular to one another and to the first direction. Accordingly, the cooling unit can also have a length and a width in a direction perpendicular to the first direction, which can correspond at least approximately to the length and to the width of the battery cells. As a result, both cooling and thermal insulation between the battery cells can be provided over the entire cell surfaces of the adjacent battery cells that face the cooling unit.

The fact that the first material has a higher thermal conductivity than the second material is preferably understood to mean that the first material has a thermal conductivity that is at least one order of magnitude higher than that of the second material, namely a thermal conductivity that is at least a factor of 10 higher, preferably a thermal conductivity that is at least a factor of 100 higher. The second material is therefore preferably a material with good thermal insulation properties, while the first material has a thermal conductivity that is as high as possible.

In a very advantageous embodiment of the invention, the first material is mostly or entirely a metallic material, in particular aluminum, and the second material is at least mostly or entirely made of plastic material. Very high thermal conductivities can be provided by metals in particular, so that metals are particularly well suited for forming and providing the first wall. Plastics, on the other hand, typically have a relatively low thermal conductivity, so that they are particularly suitable for providing the second wall. The formation of the first wall from aluminum is particularly advantageous since aluminum has a very high level of thermal conductivity and is also particularly light. The plastic material, from which the second wall is formed, can, under certain circumstances, also be a fiber-reinforced plastic material. The reinforcing fibers do not necessarily have to be made of plastic material, but instead of glass or carbon, for example.

In a further very advantageous embodiment of the invention, the cooling unit has a first side that faces the first battery cell and is arranged in particular on the first battery cell, and a second side that faces the second battery cell and is arranged in particular on the second battery cell, wherein the first side is provided by the first wall. The first wall, which is formed from the material with good thermal conductivity, therefore preferably contacts the first battery cell directly and planarly. The cell housing of the battery cell can optionally have electric al insulation in the region of this contact or in general, for example in the form of an insulation film. This means that the battery cell is electrically isolated from the cooling unit. The first battery cell can therefore advantageously be cooled particularly efficiently by the cooling unit due to the direct coupling to the first wall of the cooling unit.

In a further advantageous embodiment of the invention, the second side is provided by the second wall. In this case, the second battery cell thus directly contacts the second wall of the cooling unit, which is made of the material with the lowest possible thermal conductivity. As a result, the second battery cell is very well thermally insulated from the first battery cell. However, as a result, the second battery cell is cooled significantly less well by the cooling unit than the first battery cell. However, this can be compensated for in a simple manner by providing a further cooling unit on the other side of this battery cell, which is then arranged, for example, between the second battery cell and a further third battery cell of the battery module, so that the second battery cell is in direct contact with the better thermally conductive wall of this further cooling unit. In other words, such a cooling unit can be arranged between two battery cells arranged adjacent in the first direction, so that each battery cell is, on the one hand, in direct contact with the respective first wall of the respective adjacent cooling unit and on the other hand in contact with a respective second wall of the corresponding cooling unit on the other side. This applies at least to battery cells that are not "edge cells", wherein such edge cells correspondingly only have a single adjacent battery cell in or against the first direction. However, a cooling unit can also be arranged on both sides of such edge cells. A good cooling of all battery cells enclosed by the battery module can thus be provided. As a result, the installation space requirement of a respective cooling unit in the first direction is also extremely small.

In a further advantageous embodiment of the invention, the cooling unit has a third wall and a second intermediate space through which a coolant can flow between the second wall and the third wall, wherein the third wall is formed from a third material which has a higher thermal conductivity than that of the second material, in particular wherein the third material and the first material are the same. The cooling unit can thus provide a cooling surface with a very high thermal conductivity on both sides with respect to the first direction. As a result, both battery cells adjacent to the cooling unit can advantageously be cooled very effectively and evenly.

Accordingly, it represents a further advantageous embodiment of the invention when the second side of the cooling unit, which faces the second battery cell, is provided by the third wall. This means that both battery cells adjacent to the cooling unit can be equally well cooled by the cooling unit. In order to save installation space in the first direction, provision can be made for such a cooling unit to be provided only between every second pair of cells or after every second cell of the multiple battery cells arranged next to one another in the first direction, so that each battery cell is either in contact with only one first wall or with only one second wall of one of the cooling units. Thus, due to the cooling on both sides, which is provided by a respective cooling unit, a one-sided cooling of all cells can be provided in the same way and in a space-saving manner.

It is also conceivable that such a cooling unit is arranged between each two of the battery cells arranged adjacent in the first direction. Cell and cooling unit thus alternate in the first direction with regard to their arrangement. As a result, cooling can be provided on both sides for each cell, or a cooling that is uniformly efficient on both sides. This is conducive to a homogeneous temperature distribution within a battery cell.

In a further advantageous embodiment of the invention, the cooling unit has support elements between the first wall and the second wall for supporting the first wall relative to the second wall, and in particular also support elements between the second wall and the third wall. These support elements advantageously increase the stability of the cooling unit with regard to the effect of pressure in and against the first direction. It is particularly advantageous when the cells of the battery module are clamped together with respect to the first direction, since this clamping force can be counteracted by the supporting elements. As a result, there is no risk that the intermediate space between the first and second wall, and in particular also the second intermediate space between the second and third wall, will be compressed or completely collapse due to this clamping force. This is particularly advantageous in the case of a very narrow intermediate space in the first direction, since this preferably has a maximum thickness of a few millimeters in the first direction, just like the entire cooling unit. The thickness of the entire cooling unit, for example with two intermediate spaces and three walls, is, for example, a maximum of 20 millimeters and preferably a maximum of 10 millimeters, and correspondingly approximately half that with only one intermediate space and two walls.

In general, the support elements can have the most varied forms. For example, these can be provided as punctual, for example as pin-shaped support points that run from the first wall to the second wall, in particular continuously, and around which a coolant flowing through the intermediate space can flow on all sides. However, the support elements can also be in the form of elongated webs, for example, which extend in at least a second direction perpendicular to the first direction, wherein the second direction preferably corresponds to a flow direction in which the coolant can flow through the intermediate space. As a result, little or no flow resistance is generated by the supporting elements. The intermediate space can, so to speak, be divided into individual cooling channels by means of such elongated support webs. Nonetheless, the support points may also be designed in such a way that individual openings are then present between the cooling channels.

Furthermore, it is preferred that the support points are also formed from the second material, in particular from plastic material. This has the advantage that the support points can be formed in one piece with the second wall, for example. The second wall with the support points can be produced, for example, by means of injection molding. In particular, it is also conceivable to first provide the first wall and the optional third wall made of metal, and to overmold them in an injection molding process in such a way that, between the first and the optional third wall, the second wall with the corresponding support points are formed between the first and second wall and in particular between the second and third wall. It can also be advantageous if the first and third walls are formed, for example, with openings in the first direction, through which the second material can pass for the formation of the support points during injection molding. As a result, the support points can also be designed in such a way that, after penetrating the openings in the first and the optional third wall, they then have a widening on a side of the first or third wall facing away from the second wall, similar to a screw head. As a result, a robust connection can be created between the first and second wall and in particular also between the second and the optional third wall.

In a further very advantageous embodiment of the invention, the cooling unit has a first coolant supply connection, via which a coolant can be supplied to the first intermediate space, and a first coolant discharge connection, via which the coolant supplied to the first intermediate space can be discharged from the latter, in particular wherein, via the first coolant supply connection or via a second coolant supply connection of the cooling unit, a coolant can be supplied to the second intermediate space and the coolant supplied to the second intermediate space can be discharged from the latter via the first or a second coolant discharge connection of the cooling unit.

A coolant supply connection and a coolant discharge connection are therefore provided for the first intermediate space. If, according to an embodiment of the invention, there is also a second intermediate space, either the same coolant supply connection can be used to also supply the coolant to the second intermediate space, and in particular the same coolant discharge connection can also be used to discharge the coolant from the second intermediate space again, or separate coolant supply and coolant discharge connections can be provided for the two intermediate spaces, respectively. In addition, these can each be coupled to a common collecting line. This means that, for example, all coolant supply connections, in particular those of different cooling units, can be supplied with coolant via a common coolant supply line, and accordingly the coolant can be discharged again via a separate coolant discharge line, to which all coolant discharge connections, also those of different cooling units, can be connected. As a result, a particularly efficient coolant supply and coolant discharge can be provided.

The first coolant supply connection and the first coolant discharge connection can be arranged, for example, on the same side or on different sides of the cooling unit. If these are arranged on different sides, it is advantageous to arrange them, for example, on opposite sides of the cooling unit. If these are arranged on different sides, the coolant can be supplied to the first intermediate space of the cooling unit on one side and discharged again from the other side after passing through the first intermediate space. If these are arranged on the same side of the cooling unit, then, for example, one of said support points can be provided as a separating web to provide a curved cooling channel. The coolant can accordingly be supplied to the first intermediate space of the cooling unit on one side, flows through the intermediate space to the other side, is deflected accordingly and supplied back and discharged again via the first coolant discharge connection on the same side of coolant supply to the cooling unit. The cooling channel within the cooling unit, which is provided by the first intermediate space, can extend, for example, in a U-shape or also in a number of tortuous meandering or zigzag-shaped lines or the like.

However, it is preferred that, if a second intermediate space is provided, the coolant that flows through the first intermediate space to cool the first battery cell does not also flow through the second intermediate space to previously or subsequently cool also the second battery cell. This is advantageous in order to provide efficient thermal decoupling of the first and second battery cells Furthermore, the battery module can have two side plates, which delimit the cell stack formed by the multiple battery cells on both sides in a second direction perpendicular to the first direction. The above mentioned coolant supply line and coolant discharge line can then be correspondingly integrated into these side plates. Both can also be integrated into the same side plate. The available installation space is thus used particularly efficiently. Furthermore, the battery module can also have a carrier plate, which delimits the battery module or the cell stack provided by the cells with respect to a third direction. This base plate can be designed as an additional cooling plate or cooling device or can only function as a carrier without an active cooling function. As a result, further installation space can be saved. Above all, no gap filler has to be provided for connecting the cells to the carrier. In this case, the base plate can be a carrier plate for simultaneously carrying multiple battery modules. The base plate can thus provide a bottom of an overall battery housing in which several battery modules, in particular battery modules according to the invention and the battery modules according to exemplary embodiments of the invention, are arranged to form or provide a high-voltage battery. A housing cover of the overall battery housing can be arranged opposite the base plate.

According to a further advantageous embodiment of the invention, the battery module has multiple cooling units, wherein one of the cooling units is arranged between each two battery cells arranged adjacent in the first direction. This configuration is particularly advantageous, especially when the second wall represents the one that directly adjoins the second side of the cooling unit which is directly adjacent to the second battery cell. Efficient cooling of each battery cell can thus be provided. Alternatively, it is also conceivable that the battery cells arranged in the first direction form multiple cell pairs in such a way that each battery cell is part of at most or exactly one cell pair, wherein one of the cooling units is arranged between the battery cells of a respective cell pair, so that each of the battery cells is arranged next to exactly one of the cooling units, relative to the first direction. This provides at least one-sided cooling of a respective battery cell. In this case, it is preferred that the cooling units each also have a third wall, since each battery cell is then adjacent to a wall with good thermal conductivity, namely either the first or third wall of the cooling unit, although such a cooling unit does not have to be arranged between two battery cells, but only between every second battery cell, for example.

However, other configurations are also conceivable, for example each cell does not necessarily have to be arranged adjacent to a cooling unit.

Furthermore, the invention also relates to a high-voltage battery for a motor vehicle, wherein the high-voltage battery has one battery module according to the invention or one of its embodiments. In particular, the high-voltage battery can comprise multiple battery modules according to exemplary embodiments of the invention.

Furthermore, the invention also relates to a motor vehicle having a battery module according to the invention or one of its embodiments.

Furthermore, the invention also relates to a method for producing a battery module, wherein the battery module is provided with multiple battery cells arranged next to one another in a first direction, and wherein at least one cooling unit is provided, which has a first wall and a second wall, and a first intermediate space through which a coolant can flow, which intermediate space is arranged between the first and second wall in relation to the first direction, and which is delimited by the first and second wall in and against the first direction. Furthermore, the cooling unit is arranged between a first and a second battery cell of the multiple battery cells which are arranged adjacently in the first direction. In this case, the cooling unit is provided with the first wall formed from a first material which has a higher thermal conductivity than a second material from which the second wall is formed.

The advantages described in relation to the battery module according to the invention and its embodiments apply in the same way to the method according to the invention.

The invention also includes developments of the method according to the invention, which have the same features which have already been described in conjunction with the developments of the battery module according to the invention. For this reason, the corresponding developments of the method according to the invention are not described again here.

The motor vehicle according to the invention is preferably designed as an automobile, in particular as a passenger car or truck, or as a passenger bus or motorcycle.

The invention also comprises the combinations of the features of the described embodiments. The invention also includes implementations that each comprise a combination of the features of several of the described embodiments, provided that the embodiments were not described as mutually exclusive.

BRIEF DESCRIPTION OF THE DRAWINGS

Exemplary embodiments of the invention are described hereinafter. In particular.

DETAILED DESCRIPTION

Figure 1:
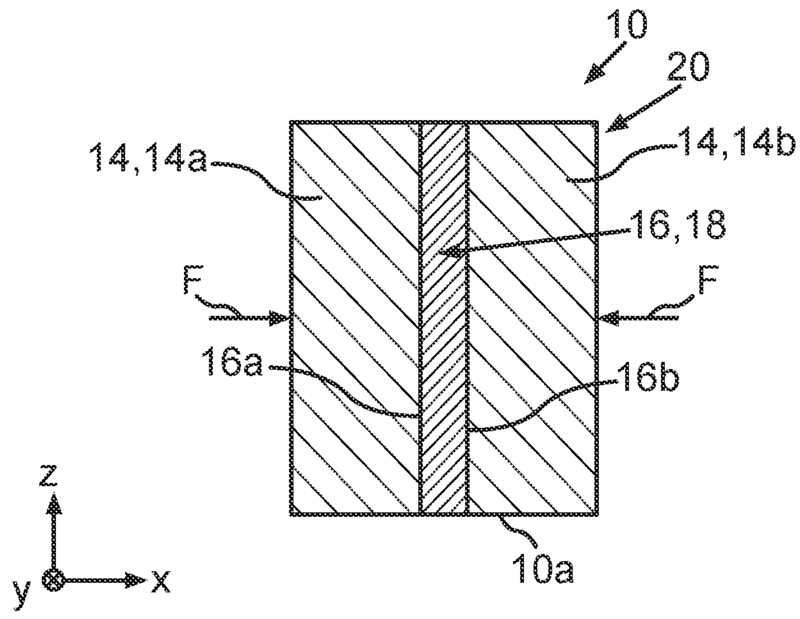
FIG. 1 shows a schematic representation of a battery module in a side view without side plates according to an exemplary embodiment of the invention.

The exemplary embodiments explained hereinafter are preferred embodiments of the invention. In the exemplary embodiments, the described components of the embodiments each represent individual features of the invention to be considered independently of one another, which each also develop the invention independently of one another. Therefore, the disclosure is also intended to comprise combinations of the features of the embodiments other than those represented. Furthermore, the described embodiments can also be supplemented by further ones of the above-described features of the invention.

In the figures, same reference numerals respectively designate elements that have the same function.

FIG. 1 shows a schematic representation of a battery module 10 or at least part thereof according to an exemplary embodiment of the invention. The battery module 10 is shown in a side view without the side plates 12 being shown (cf. FIG. 2). In this case, the battery module 10 comprises multiple battery cells 14 arranged next to one another in a stacking direction x, such as a first battery cell 14*a* and a second battery cell 14*b* in this example. A cooling unit 16 as part of a cooling device 18 is arranged between the two battery cells 14*a*, 14*b*. This cooling unit 16, which is explained in more detail below, has a first side 16*a*, which is directly adjacent to the first battery cell 14*a*, and a second side 16*b*, which is directly adjacent to the second battery cell 14*b*.

In addition, the battery cells 14 can be designed, for example, as prismatic battery cells or pouch cells. The cooling unit 16 is designed as a type of cooling plate, which is then placed between the prismatic cells 14 or pouch cells 14 accordingly. Optionally, the cells 14 can also be clamped together in the x-direction and thus pretensioned. The pre-tensioning force acting on the cells 14 is illustrated schematically by the arrows F in FIG. 1.

Figure 2:
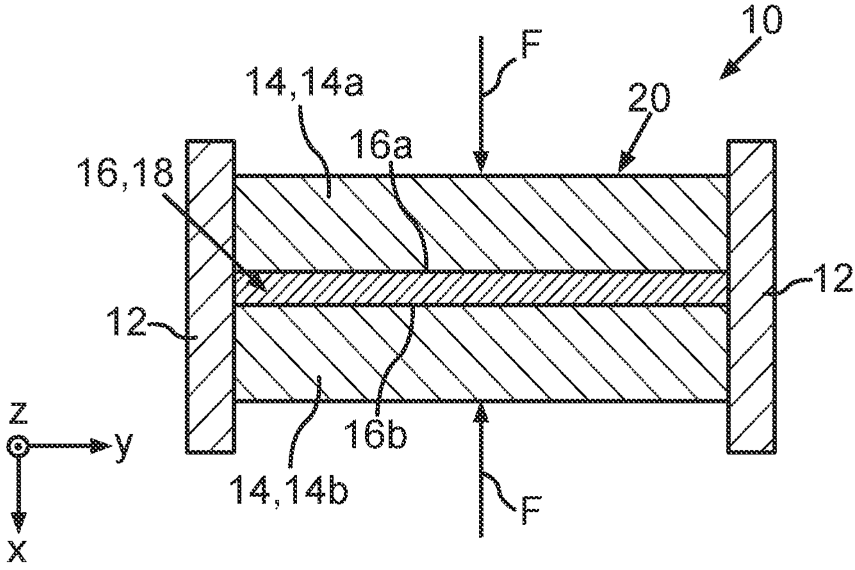
FIG. 2 shows a schematic representation of the battery module of FIG. 1 in plan view with side plates, according to an exemplary embodiment of the invention.

FIG. 2 shows a schematic representation of the battery module 10 from FIG. 1 in a plan view with side plates 12 now represented. The battery module 10 can therefore be designed as described for FIG. 1. The side plates 12 can be part of a module housing or a frame surrounding the battery module or the cell stack 20. The side plates 12 can also be part of the aforementioned tensioning device. The side plates can also be part of an overall battery housing and can be provided, for example, as a side wall or partition wall that separates or laterally delimits the receiving regions of the battery housing. The battery module 10 can also have numerous other battery cells 14. Such a cooling unit 16 can be arranged between each two cells 14 arranged adjacent in the x-direction. However, it can also be provided that such a cooling unit 16 is arranged only after every second cell 14 in the x-direction. In particular, this can also depend on the design of the cooling unit 16 itself.

Figure 3:
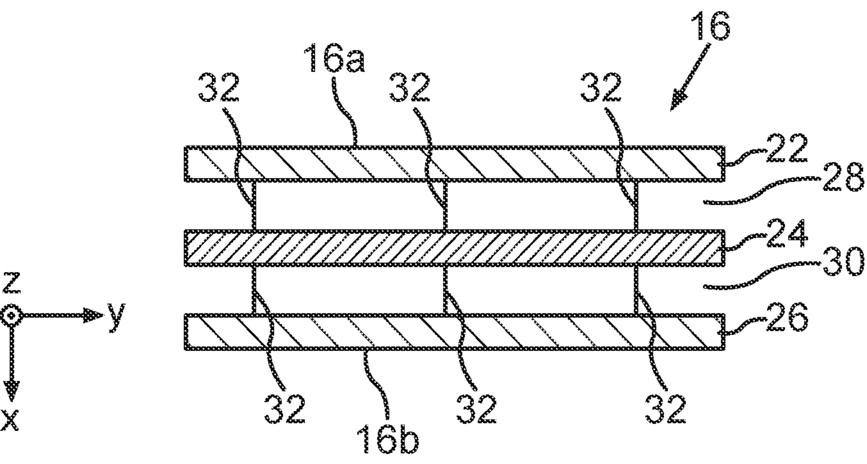
FIG. 3 shows a schematic representation of a cooling unit in a plan view for a battery module according to an exemplary embodiment of the invention.

FIG. 3 shows a schematic representation of a cooling unit 16 for a battery module 10 in a plan view on the z-direction shown according to an exemplary embodiment of the invention. The cooling unit 16 has a first wall 22 and a second wall 24, and also in this example a third wall 26. A first intermediate space 28 is provided between the first and second wall 22, 24 and a second intermediate space 30 is provided between the second wall 24 and the third wall 26. The first wall 22 and in particular also the third wall 26 are formed from a material which has a significantly greater thermal conductivity than the material from which the second wall 24 is formed. Preferably, the first and third walls 22, 26 are metallic walls, such as of aluminum, and the second wall 24 is a plastic wall. This second wall 24 thus provides a thermal insulator 24 which is located centrally between the two outer walls 22, 26 which in turn provide thermal conductors at the surface of the cooling unit 16. Furthermore, in this example, respective support elements 32 are arranged between the first wall 22 and the second wall 24 and between the second wall 24 and the third wall 26. Between the insulator 24 and the conductors 22, 26 a reinforcement with a honeycomb structure can be provided, for example, which provides such support elements 32 accordingly. These support elements 32 can be provided at single points, for example in the form of a knob structure or in the form of pins on the second wall 24, or also in the form of elongated webs or the like, in particular on the wall surfaces of the second wall 24 facing the first and third wall 22, 26.

As a concrete example, aluminum plates, as the first and third walls 22, 26, can be centrally overmolded with plastic material to provide the second wall 24. At the same time, the support elements 32, which are preferably also made of plastic material and are preferably formed integrally with the second wall 24, can also be provided.

If the support elements 32 are in the form of elongated webs, it is preferable for these to be aligned parallel to a flow direction in which a coolant is to flow through the cooling unit 16, in particular the respective intermediate spaces 28, 30. This direction of flow is at least for the most part essentially parallel to the y-direction shown here. However, a flow in and/or against the z-direction is also conceivable.

In principle, it is preferred that a cooling medium flows through the cavities 28, 30 between the insulator 24 and the conductors 22, 26. In principle, however, it is also possible to use the cooling unit 16 as a stand-alone cell separation element. In other words, the cooling unit 16 does not necessarily have to be able to provide active cooling, but the cooling unit 16 can also be used as a passive cooling element. A thermal coupling of the walls 22, 26 to an active cooling is advantageous.

In any case, the cooling unit 16 can advantageously provide a particularly efficient cooling of the adjacent cells 14, and at the same time, through the insulator 24 and above all through the intermediate spaces 28, 30, through which a coolant can optionally flow, such as water or water with additives, a very good thermal decoupling can be provided between the two cells 14, between which this cooling unit 16 is arranged. When there is a cold liquid coolant in the intermediate spaces 28, 30, the two adjacent cells 14 are, so to speak, thermally decoupled by a cold wall. This is very advantageous above all in the event of a thermal runaway of one of the battery cells 14 since a thermal spill out to the adjacent cell 14 can be prevented in a significantly more efficient manner. In addition, it is preferred that there is no gap filler between such a cooling unit 16 and an adjacent one 14. Nevertheless, it would also be conceivable in this case for a gap filler to be provided between the cooling unit 16 and the respective adjacent cell 14. In contrast to conventional arrangements of cooling devices, in which the cells are typically arranged on a common cooling plate, in this case no thermal bridges between the cells are produced by the gap filler. This further increases security.

Figure 4:
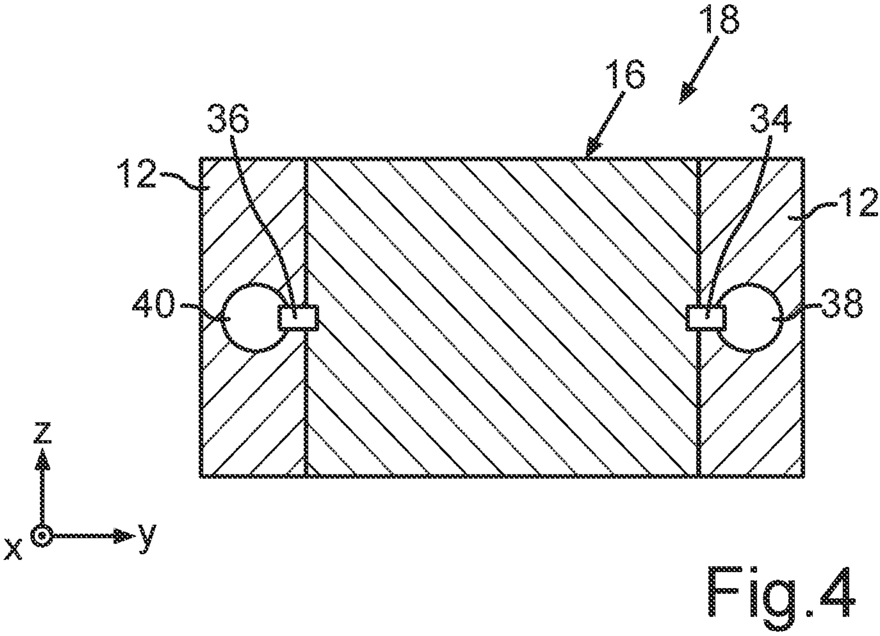
FIG. 4 shows a schematic representation of the cooling unit and part of the side plates adjacent thereto in a schematic cross-sectional representation according to an exemplary embodiment of the invention.

FIG. 4 shows a schematic representation of the cooling unit 16 and the side walls 12 in a schematic cross-sectional representation perpendicular to the represented x-direction. The cooling unit 16 has at least one inlet, namely a coolant supply connection 34, and one outlet, namely a coolant discharge connection 36. The coolant can be supplied to the cooling unit 16 via the inlet 34 and discharged again via the outlet 36. One such inlet 34 and outlet 36 can be provided for each intermediate space 28, 30, or the inlet 34 can be used as a common inlet for both intermediate spaces 28, 30, and accordingly the outlet 36 can also be used as a common outlet for both intermediate spaces 28, 30. Furthermore the inlet 34 is fluidically coupled to a first collecting duct 38, which represents a coolant supply line, and the outlet 36 is correspondingly coupled to a second collecting duct 40, which correspondingly represents a coolant discharge line. In this example, the coolant supply line 38 and the coolant discharge line 40 can extend in or against the x-direction within the respective side plates 12 and can be integrated therein. This enables a particularly space-saving arrangement. It is also conceivable to arrange the coolant supply and discharge connections 34, 36 and the corresponding collecting lines 38, 40 on the same side of the cooling unit 16, in particular with regard to the y-direction shown here, so that they may be integrated into the same side plate 12, for example. Instead of the collecting ducts shown, the individual inlets 34 and the individual outlets 36 can also be supplied by multiple cooling units 16 via separate supply lines. Thus, the inlet and outlet 34, 36 can be supplied individually or with a collecting duct 38, 40 which can be integrated into the side plates 12 as described. The number and position of inlets and outlets can also be varied, namely it can be designed in any other way.

In general, it is not necessary to insert such a cooling unit 16 in the form of a cold plate between each cell 14. The battery cells 14 can also only be cooled on one side. This can be accomplished by having only one such cooling unit 16 after every other cell 14, or by having only one thermal conductor 22 per cooling unit 16. In other words and with reference to FIG. 3, the cooling unit 16 can optionally also be designed in such a way that the second side 16*b* of the cooling unit 16 is not provided by the third wall 26 but instead by the second wall 24. In this case, the third wall 26 and the corresponding support elements 32 between the second wall 24 and the third wall 26 are omitted. The second wall 24, which provides the thermal insulator, then directly adjoins the second cell 14*b*. The second cell 14*b* is then correspondingly not cooled by this cooling unit 16 or not as much as the first cell 14*a*. However, such a cooling unit 16 is also provided adjacent to the second cell 14*b* on the other side, so that this second cell 14*b* is then correspondingly adjacent to the first wall 22 and thus to the thermal conductor of the cooling unit 16. This also provides an one-sided cooling of a respective battery cell 16. In this way, the installation space required in the x-direction can also be reduced.

Furthermore, it is nevertheless possible to additionally cool the battery base, that is to say the underside of the battery module 10, which is referred to as 10*a* in FIG. 1, in the classic manner. A cooling plate or a conventional cooling device, which can be provided by a battery housing base, can therefore be arranged on the base 10*a* of the battery module 10.

Overall, the examples show how a cooling plate with a thermal propagation preventing function can be provided by the invention.

The invention claimed is:

1. A battery module comprising:
- multiple battery cells arranged next to one another in a first direction;
- a cooling device comprising a cooling plate which is arranged between at least a first battery cell and a second battery cell of the multiple battery cells which are arranged adjacent in the first direction, wherein the cooling plate comprises:
  - a first wall formed from a first material, and
  - a second wall, formed from a second material that is different from the first material, and the first material has a higher thermal conductivity than the second material,
  - a third wall, wherein the second wall is located centrally between the first wall and the third wall,
  - a first intermediate space through which coolant is configured to flow between the first wall and the second wall, and
  - a second intermediate space through which a coolant is configured to flow between the second wall and the third wall.

2. The battery module of claim 1, the first material is completely made of aluminum, and the second material is completely made of a plastic material.

3. The battery module of claim 1, wherein the cooling plate further comprises:
- a first side, which faces the first battery cell, and arranged on the first battery cell, and
- a second side, which faces the second battery cell, and arranged on the second battery cell, wherein the first side is provided by the first wall.

4. The battery module of claim 3, wherein the second side is provided by the second wall.

5. The battery module of claim 1, wherein
- the third wall is formed from a third material which has a higher thermal conductivity than that of the second material and
- the third material and the first material are the same.

6. The battery module of claim 5, wherein the second side of the cooling plate is provided by the third wall.

7. The battery module of claim 1, wherein the cooling plate further comprises:
- support elements between the first wall and the second wall configured to support the first wall against the second wall, and
- support elements between the second wall and the third wall.

8. The battery module of claim 1, wherein the cooling plate further comprises:
- a first coolant supply connection, via which a coolant is configured to be supplied to the first intermediate space, and
- a first coolant discharge connection configured to discharge the coolant supplied to the first intermediate space via the first coolant supply connection or via a second coolant supply connection of the cooling plate, a coolant is configured to be supplied to the second intermediate space and the coolant supplied to the second intermediate space is configured to be discharged from the latter via the first coolant discharge connection or a second coolant discharge connection of the cooling plate.

9. The battery module of claim 1, wherein the battery module has multiple cooling plates
- wherein a first cooling plate is arranged between each two battery cells arranged adjacent in the first direction, or
- wherein the battery cells arranged in the first direction form multiple cell pairs such that each battery cell is part of at most or exactly one cell pair, wherein the first cooling plate is arranged between the battery cells of a respective pair of cells, so that each of the battery cells is arranged next to exactly one cooling plate with respect to the first direction.

10. A method for producing a battery module, comprising:
- providing the battery module with multiple battery cells arranged next to one another in a first direction,
- providing a cooling plate comprising:
  - a first wall,
  - a second wall,
  - a third wall, wherein the second wall is located centrally between the first wall and the third wall,
  - a first intermediate space through which coolant is configured to flow, between the first wall and the second wall, and
  - a second intermediate space through which a coolant is configured to flow between the second wall and the third wall,
- arranging the cooling plate between a first battery cell and a second battery cell of the multiple battery cells arranged adjacent in the first direction, wherein the cooling plate is provided with the first wall formed from a first material which has a higher thermal conductivity than a second material from which the second wall is formed.

11. The battery module of claim 2, wherein the cooling plate further comprises:

a first side, which faces the first battery cell, and arranged on the first battery cell, and a second side, which faces the second battery cell, and arranged on the second battery cell, wherein the first side is provided by the first wall.

12. The battery module of claim 2, wherein the third wall is formed from a third material which has a higher thermal conductivity than that of the second material, and the third material and the first material are the same.

13. The battery module of claim 3, wherein the third wall is formed from a third material which has a higher thermal conductivity than that of the second material, and the third material and the first material are the same.

14. The battery module of claim 2, wherein the cooling plate further comprises:

support elements between the first wall and the second wall for supporting the first wall against the second wall, and support elements between the second wall and the third wall.

15. The battery module of claim 3, wherein the cooling plate further comprises:

support elements between the first wall and the second wall for supporting the first wall against the second wall, and support elements between the second wall and the third wall.

16. The battery module of claim 4, wherein the cooling plate further comprises:

support elements between the first wall and the second wall configured to support the first wall against the second wall, and support elements between the second wall and the third wall.

17. The battery module of claim 5, wherein the cooling plate further comprises:

support elements between the first wall and the second wall configured to support the first wall against the second wall, and support elements between the second wall and the third wall.

18. The battery module of claim 6, wherein the cooling plate further comprises:

support elements between the first wall and the second wall configured to support the first wall against the second wall, and support elements between the second wall and the third wall.

19. The battery module of claim 2, wherein the cooling plate further comprises:

a first coolant supply connection configured to supply a coolant to the first intermediate space, and a first coolant discharge connection configured to discharge the coolant supplied to the first intermediate space, via the first coolant supply connection or via a second coolant supply connection of the cooling plate, a coolant is configured to be supplied to the second intermediate space and the coolant supplied to the second intermediate space is configured to be discharged from the latter via the first coolant discharge connection or a second coolant discharge connection of the cooling plate.

20. The battery module of claim 3, wherein the cooling plate further comprises:

a first coolant supply connection configured to supply a coolant to the first intermediate space, and a first coolant discharge connection configured to discharge the coolant supplied to the first intermediate space, via the first coolant supply connection or via a second coolant supply connection of the cooling plate, a coolant is configured to be supplied to the second intermediate space and the coolant supplied to the second intermediate space is configured to be discharged from the latter via the first coolant discharge connection or a second coolant discharge connection of the cooling plate.

* * * * *